United States Patent Office 3,251,885
Patented May 17, 1966

3,251,885
PROCESS FOR PREPARING COMPLEX CARBONATED METAL SALTS OF ALKYL PHENOL SULFIDES
Richard P. Neville, St. Louis, Mo., assignor to Monsanto Chemical Company, St. Louis, Mo., a corporation of Delaware
No Drawing. Filed Dec. 6, 1961, Ser. No. 157,593
7 Claims. (Cl. 260—609)

This invention relates to an improvement in processes for preparing complex carbonated metal salts of alkyl phenol sulfides.

Complex metal salts of alkyl phenol sulfides are products known in the art, having found wide use as detergents and dispersants in oils, particularly mineral lubricating oils. According to the teachings of the art, the complex salts to which this invention is directed can be prepared by reacting an alkyl phenol sulfide with a metal alcoholate, or metal oxide in the presence of an alcohol, in such proportions as to provide about 1.2 to about 1.6 equivalents of metal per equivalent of phenol hydroxyl in the alkyl phenol sulfide reactant, reacting the resulting product with carbon dioxide, and then reacting the carbonated product with additional metal alcoholate, or metal oxide in the presence of an alcohol, in an amount to supply from about 0.1 to about 1.0 equivalent of metal per equivalent of phenol hydroxyl in the alkyl phenol sulfide reactant.

More specifically, the metal alcoholate process is generally carried out as follows: The alkyl phenol sulfide and a solvent, such as a mineral oil, are charged to a suitable reactor fitted with a mechanical stirrer, a dropping funnel, and a condenser arranged for removal of condensate. The metal alcoholate reagent is slowly added through the dropping funnel to the phenol sulfide-oil blend with continuous stirring while the reaction mixture is heated at a temperature sufficient to distill uncombined alcohol. Depending upon the alcoholate used, the temperature of the reaction can range from about 60° C. to about 150° C.

In the case of the metal oxide process, after the alkyl phenol sulfide and a solvent, such as a mineral oil, have been charged, metal oxide is added and then a small amount of alcohol is slowly charged. Thereafter the temperature of the reaction mass is raised to 60–150° C., depending upon the alcohol used, where it is maintained for several hours.

Thereafter the reaction mass from either process is treated in the same manner as described hereinafter.

The temperature of the reaction mixture is increased from about 125° C. to about 200° C., and the pressure reduced to complete the reaction and removal of uncombined alcohol. Carbon dioxide is then passed into the reaction mixture for several hours at the upper temperature level. The product is then usually filtered. Before final filtration, however, the complex product may be subjected to further metalization and carbonation, whereby still further amounts of metal are introduced into the complex.

In carrying out such processes, the use of a solvent has been found advantageous due to the fact that the alkyl phenol sulfide reactant, as well as the complex salts produced, are generally quite viscous. The solvent reduces the viscosity of the reaction mixture and greatly facilitates other steps in the process, particularly the final filtration step. Suitable solvents are hydrocarbon solvents having boiling ranges sufficiently high so as not to further complicate the process, such as mineral oil, petroleum naphtha, and the like. The use of a mineral oil, however, is preferred since it need not be removed from the final product, the oil solution of the product thus obtained being directly blendable wtih a lubricating oil or other petroleum fraction. Accordingly, the use of an oil is generally referred to herein.

By the procedure outlined above, the ratio of phenol hydroxyl to carbon dioxide to metal in the complex salt products will range from about 0.2 to about 0.6 equivalent of carbon dioxide to from about 1.6 to about 2 equivalents of metal for each equivalent of phenol hydroxyl in the alkyl phenol sulfide reactant.

It has now been found that products equivalent to those obtained from the prior art processes as described above can be obtained in one metalization-carbonation sequence by conducting the carbonation step in such processes prior to removal of alcohol.

When ultizing the improvement of this invention, the temperatures, reactants, equipment, etc., are the same as those used in the prior art processes. Thus, the alkyl phenol sulfides to which the method of this invention can be applied are alkyl phenol sulfides of the class represented by the general formula,

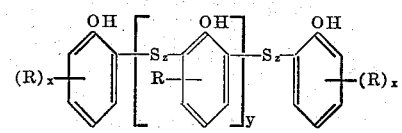

wherein R represents an alkyl radical having from about 5 to about 24 carbon atoms, $x$ represents an integer from 1 to 4, $y$ represents an integer from 0 to 3, and $z$ represents an integer from 1 to 2. As is well known, the various alkyl phenol sulfides coming within the aforesaid formula may be prepared by reaction of alkylated phenols with either sulfur monochloride or sulfur dichloride in various proportions.

As ordinarily manufactured on a commercial basis, the phenol sulfides are prepared from mixtures of alkyl phenols, and not from pure compounds, and, accordingly, it is understood, with respect to the present invention, that such mixtures as well as specific alkyl phenol sulfides are contemplated. Specific alkyl phenol sulfides useful in the process of the invention are hexyl phenol sulfide, octyl phenol sulfide, nonyl phenol sulfide, decyl phenol sulfide, dodecyl phenol sulfide, diamyl phenol sulfide, dinonyl phenol sulfide, hexadecyl phenol sulfide, octadecyl phenol sulfide, wax phenol sulfide, and the like.

The metal alcoholates and oxides generally used in the processes of the art are those of the metals, barium, calcium, magnesium, and sodium, although other metals have been used. The alcohols generally used are the lower aliphatic alcohols, such as methyl, ethyl, propyl, isopropyl, or butyl alcohol, but again other alcohols can be used.

A non-limiting example of the application of the improvement of this invention to a prior art process, and the product obtained thereby (Example 1), is compared below with a process of the prior art (Example 2) and the product obtained thereby. In all examples, parts are parts by weight unless otherwise stated.

*Example 1*

A suitable size reaction vessel was fitted with a mechanical stirrer, thermometer, gas addition tube, dropping funnel, and reflux condenser. There were then charged to the reaction vessel 635 parts of nonyl phenol sulfide in oil (194 parts of nonyl phenol sulfide) and 142 parts of barium oxide (95%). The resulting mixture was slowly heated to 65° C. over about 10 minutes, while simultaneously charging 44 ml. of methanol. The reaction mixture was then heated to and maintained at temperatures within the range of 69° C. to 76° C. for about two hours, after which carbon dioxide was passed through the reaction mass at a rate of about 0.4 mol of $CO_2$ per equivalent of phenol hydroxyl per hour for four hours, during the last hour of which the temperature of the reaction mass was gradually increased to about 157° C. (45 minutes) and then held at about that temperature. Carbon dioxide addition was stopped and the pressure within the reaction vessel was then decreased and held at about 28 mm. of mercury for about 20 minutes while cooling the reaction mass to about 120° C. Vacuum was then released, filter aid was added, and the mass filtered. The resulting complex salt analyzed 14.7% barium, 2.6% sulfur, and 0.9% $CO_2$.

*Example 2*

Following the procedure of Example 1 and using the same quantities of materials prior to carbonation, a nonyl phenol sulfide-barium methylate mixture was prepared. The reaction mixture was then heated at about 155° C., with the pressure within the reaction vessel decreased to about 28 mm. of mercury, until the methanol was removed. Thereafter the vacuum was released, and carbon dioxide was passed through the reaction mass at a rate of about 0.4 mol of $CO_2$ per equivalent of phenol hydroxyl per hour for about four hours. Carbon dioxide addition was stopped, and the reaction product was worked up as in Example 1. The resulting complex salt analyzed 11.6% barium, 2.6% sulfur, and 0.3% $CO_2$. By additional metalization and carbonation, however, a product equivalent to that produced by the improvement of the invention, as shown in Example 1, can be produced.

From the above results, it is apparent that the improvement of this invention allows the production of complex metal salts of alkyl phenol sulfides at considerable savings in cost due to elimination of the need for more than one metalization-carbonation sequence to obtain high metal content products. Equivalent results are obtained when alkyl phenol sulfides other than nonyl phenol sulfides, other metals than barium, and other alcohols than methanol are used, as heretofore described. Thus, while the process of the invention has been described with reference to specific examples and embodiments, it is to be understood that the invention is not limited thereto and that it can be variously practiced within the scope of the following claims.

What is claimed is:

1. In a process for preparing a complex metal salt of an alkyl phenol sulfide wherein (1) an alkyl phenol sulfide is reacted with a metalizing agent selected from the group consisting of metal alcoholate and metal oxide in the presence of a lower aliphatic alcohol, and (2) the product of (1) is carbonated by reaction with carbon dioxide, the improvement comprising conducting the carbonation of the product from (1) prior to removal of said alcohol.

2. Claim 1 where the metal salt is a barium salt.

3. Claim 1 where the metal salt is a calcium salt.

4. Claim 1 where the alcohol is methanol.

5. In a process for preparing a complex barium salt of an alkyl phenol sulfide wherein (1) an alkyl phenol sulfide is reacted with a metalizing agent selected from the group consisting of barium metholate and barium oxide in the presence of methanol, and (2) the product from (1) is carbonated by reaction with carbon dioxide, the improvement comprising conducting the carbonation of the product from (1) prior to removal of methanol.

6. Claim 5 where the alkyl phenol sulfide is a diamyl phenol sulfide.

7. The process of claim 5 where the alkyl phenol sulfide is nonyl phenol sulfide.

References Cited by the Examiner

UNITED STATES PATENTS

| 2,310,449 | 2/1943 | Lightbown et al. | 260—609 |
| 2,449,026 | 9/1948 | Van Gilder | 260—609 |
| 2,895,913 | 7/1959 | Carlyle et al. | 252—18 |
| 2,956,018 | 10/1960 | Carlyle et al. | 252—18 |

FOREIGN PATENTS

| 785,196 | 10/1957 | Great Britain. |
| 786,167 | 11/1957 | Great Britain. |
| 818,323 | 8/1959 | Great Britain. |
| 821,397 | 10/1959 | Great Britain. |

CHARLES B. PARKER, *Primary Examiner.*

DANIEL D. HORWITZ, D. R. PHILLIPS,
*Assistant Examiners.*